United States Patent
Anderson et al.

(10) Patent No.: US 9,317,210 B2
(45) Date of Patent: Apr. 19, 2016

(54) BALANCING TRAFFIC THROUGH LOGICAL UNIT RANGE PARTITIONING

(71) Applicant: International Business Machines Corporation, Armonk, NY (US)

(72) Inventors: Michael S. Anderson, Hillsboro, OR (US); Malahal R. Naineni, Cedar Park, TX (US); Chandra Seetharaman, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 14/105,539

(22) Filed: Dec. 13, 2013

(65) Prior Publication Data

US 2015/0169233 A1    Jun. 18, 2015

(51) Int. Cl.
*G06F 3/06* (2006.01)

(52) U.S. Cl.
CPC ............ *G06F 3/0613* (2013.01); *G06F 3/0629* (2013.01); *G06F 3/0689* (2013.01)

(58) Field of Classification Search
None
See application file for complete search history.

(56) References Cited

U.S. PATENT DOCUMENTS

| | | | |
|---|---|---|---|
| 6,378,039 B1 | 4/2002 | Obara et al. | |
| 6,393,535 B1 | 5/2002 | Burton et al. | |
| 8,006,059 B1 | 8/2011 | Clayton-Luce | |
| 2005/0172097 A1 | 8/2005 | Voigt et al. | |
| 2007/0168610 A1 | 7/2007 | Kobayshi et al. | |
| 2008/0086618 A1 | 4/2008 | Qi | |
| 2009/0292834 A1 | 11/2009 | Neemidge et al. | |
| 2011/0029730 A1 | 2/2011 | Durocher et al. | |
| 2011/0072228 A1 | 3/2011 | Nagata et al. | |

FOREIGN PATENT DOCUMENTS

WO    2012064420 A1    5/2012

OTHER PUBLICATIONS

Office Action for U.S. Appl. No. 14/077,148 (Anderson et al., "Load Balancing Logical Units in an Active/Passive Storage System," filed Nov. 11, 2013), U.S. Patent and Trademark Office, mailed Jan. 26, 2015, 17 pages.

Final Office Action for U.S. Appl. No. 14/077,148 (Anderson et al., "Load Balancing Logical Units in an Active/Passive Storage System," filed Nov. 11, 2013), U.S. Patent and Trademark Office, mailed Jul. 29, 2015, 15 pages.

(Continued)

*Primary Examiner* — Kevin Verbrugge
(74) *Attorney, Agent, or Firm* — VanLeeuwen & VanLeeuwen; Steven L. Bennett (57) ABSTRACT

An approach is provided in which a storage system includes a first storage controller, a second storage controller, and multiple logical units. The storage system detects that a controller traffic load ratio between the first storage controller and the second storage controller has reached a threshold. As such, the storage system selects one of the logical units and partitions the selected logical unit into multiple logical units. The storage system, in turn, changes a preferred controller ownership of one of the logical unit partitions from the first storage controller to the second storage controller.

20 Claims, 8 Drawing Sheets

(56) References Cited

OTHER PUBLICATIONS

Final Office Action for U.S. Appl. No. 14/098,438 (Anderson et al., "Load Balancing Logical Units in an Active/Passive Storage System," filed Dec. 5, 2013), U.S. Patent and Trademark Office, mailed Jul. 29, 2015, 14 pages.

Office Action for U.S. Appl. No. 14/098,438 (Anderson et al., "Load Balancing Logical Units in an Active/Passive Storage System," filed Dec. 5, 2013), U.S. Patent and Trademark Office, mailed Apr. 21, 2015, 18 pages.

BALANCING TRAFFIC THROUGH LOGICAL UNIT RANGE PARTITIONING

BACKGROUND

A storage area network (SAN) is a dedicated network that provides access to consolidated, block level data storage. SANs are primarily used to make storage resources (e.g., disk arrays, tape libraries, optical jukeboxes, etc.) accessible to servers such that the resources appear as locally attached devices to the operating system.

A SAN typically includes file systems, which are logical storage abstraction mappings to the physical storage resources (storage virtualization). In a block-based storage environment, a single block of information is addressed using a logical unit (LUN) identifier and an offset within that LUN—known as a logical block addressing (LBA). The LUN identifier identifies a logical unit from multiple LUNs and is essential for managing block storage arrays of a storage area network (SAN). A typical LUN may be used with any storage resource that supports read/write processes.

A SAN may include several storage controllers that interface host systems to the LUNs. Multi-controller storage systems may be configured in an active/active configuration or an active/passive configuration. In an active/passive configuration, the SAN specifies a "preferred controller" for each logical unit. As such, a host operating system uses the preferred controller to access a particular logical unit as long as the controller is available. When the preferred controller is unavailable (e.g., network connection issue, device issue, etc.), the host operating system accesses the SAN's other storage controller.

BRIEF SUMMARY

According to one embodiment of the present disclosure, an approach is provided in which a storage system includes a first storage controller, a second storage controller, and multiple logical units. The storage system detects that a controller traffic load ratio between the first storage controller and the second storage controller has reached a threshold. As such, the storage system selects one of the logical units and partitions the selected logical unit into multiple partitions. The storage system, in turn, changes a preferred controller ownership of one of the logical unit partitions from the first storage controller to the second storage controller.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The following detailed description will generally follow the summary of the disclosure, as set forth above, further explaining and expanding the definitions of the various aspects and embodiments of the disclosure as necessary.

Figure 1:
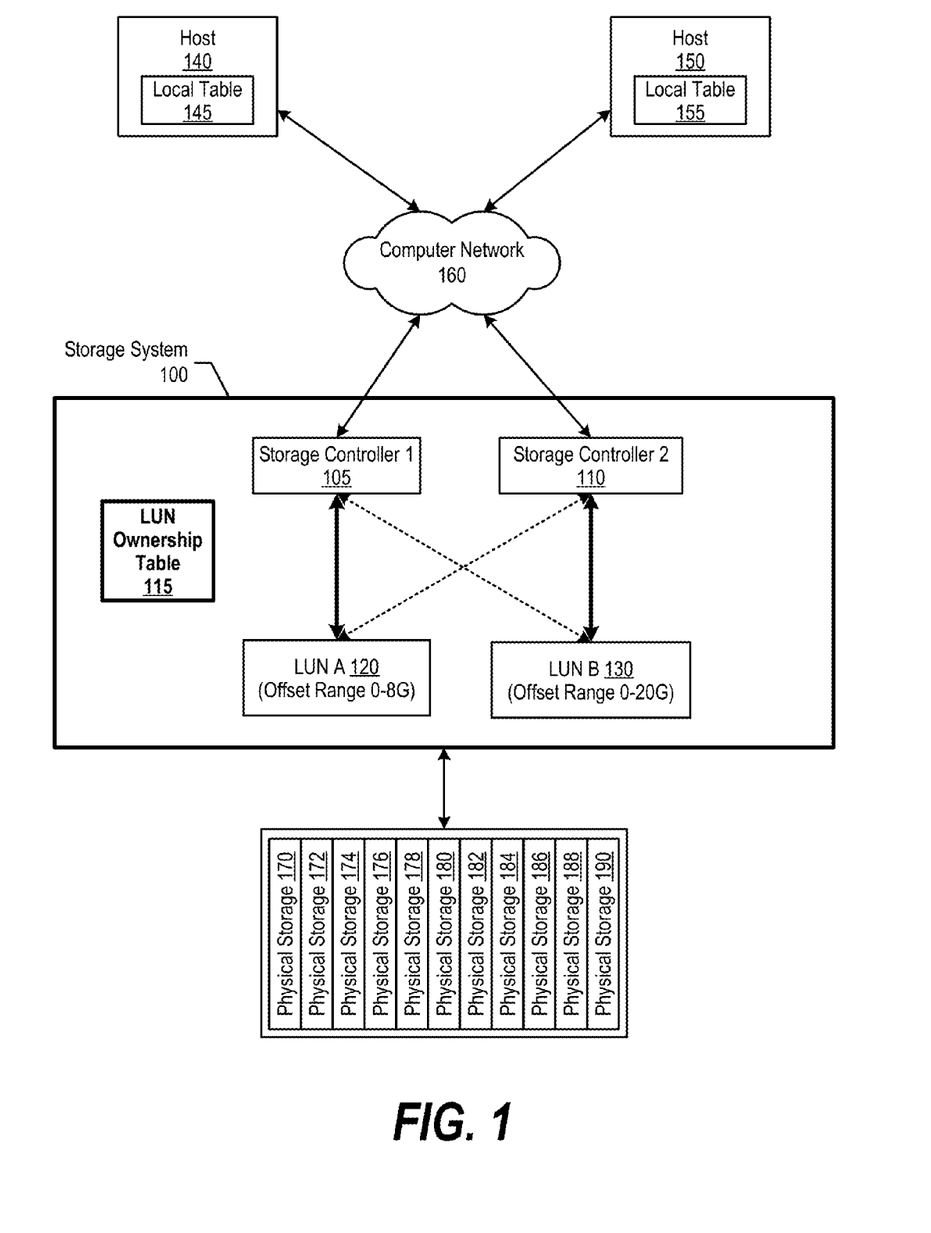
FIG. 1 is a diagram showing an example of a storage system dynamically adjusting preferred controller logical unit ownership by splitting a logical unit into logical unit partitions based upon traffic loads at the storage controllers.

FIG. 1 is a diagram showing an example of a storage system dynamically adjusting preferred controller logical unit ownership by splitting a logical unit into logical unit partitions based upon traffic loads at the storage controllers. Storage system 100 (e.g., a storage area network) includes logical units 120 and 130, which provide a logical storage abstraction of physical storages 170-190 to hosts 140 and 150. In one embodiment, physical storages 170-190 are aggregated into storage pools from which the logical storage is created. Such storage virtualization helps achieve location independence by abstracting the physical location of the data. As such, storage system 100 presents to hosts 140 and 150 a logical space for data storage and handles the process of mapping the data to the actual physical location (physical storage 170-190).

Storage controllers 105 and 110, in one embodiment, manage data traffic between logical units 120 and 130 and hosts 140-150 in an active/passive configuration. Those skilled in the art understand that, in an active/passive configuration, each logical unit has an assigned preferred controller and an assigned current controller. A particular logical unit's preferred controller is the controller a host should use when the host unit accesses the logical unit. A logical unit's current controller is the controller temporarily utilized by a host when the host is unable to access the logical unit via the preferred controller (e.g., network connection issues, controller issues, etc.).

Storage system 100 may initially configure preferred controller logical unit ownership according to default parameters, such as assigning half of the logical units to storage controller 105 and the other half of the logical units to the storage controller 110. Storage system 100 uses logical unit (LUN) ownership table 115 to track logical unit controller ownership information via preferred controller identifiers and current controller identifiers. FIG. 1 shows (solid lines) that storage controller 1 105 is the designated preferred controller for logical unit A 120, and storage controller 2 110 is the designated preferred controller for logical unit B 130. The dashed lines shown in FIG. 1 represent storage system 100's active/passive configuration in that preferred controller ownership may be dynamically updated to balance data traffic loads between storage controller 1 105 and storage controller 2 110, such as by splitting LUN A 120 and/or LUN B 130 into logical unit partitions and assigning one of the logical unit partitions to storage controller 1 105 an another one of the logical unit partitions to storage controller 2 110.

When host 140 receives a request from an application to access data, host 140 identifies a logical unit and access offset corresponding to the request. In turn, host 140 sends an inquiry to storage system 100 to receive information (stored in LUN ownership table 115) as to the logical unit's preferred controller (which may include partition offset range information if the logical unit has been partitioned). In turn, host 140 stores the preferred controller information (including the logical unit partition offset range information in local table 145 and begins accessing the logical unit through the preferred controller (see FIG. 4 and corresponding text for further details). In one embodiment, host 140 may also send an inquiry to storage system 100 at timed intervals and/or during configuration.

As network activity increases, storage system 100 monitors the "controller traffic load ratio" between logical unit data traffic passing through storage controller 1 105 and storage controller 2 110. When storage system 100 detects an unbalanced amount of traffic passing through one storage controller compared to the other storage controller, storage system 100 dynamically changes the preferred controller ownership of one or more of the logical units via logical unit ownership table 115. Based upon detected unbalance, storage system 100 may change the preferred controller of an entire logical unit, or storage system 100 may split a logical unit into logical unit partitions and, in turn, change the preferred controller ownership of one or more of the logical unit partitions (see FIGS. 3, 5, and corresponding text for further details).

Figure 2:
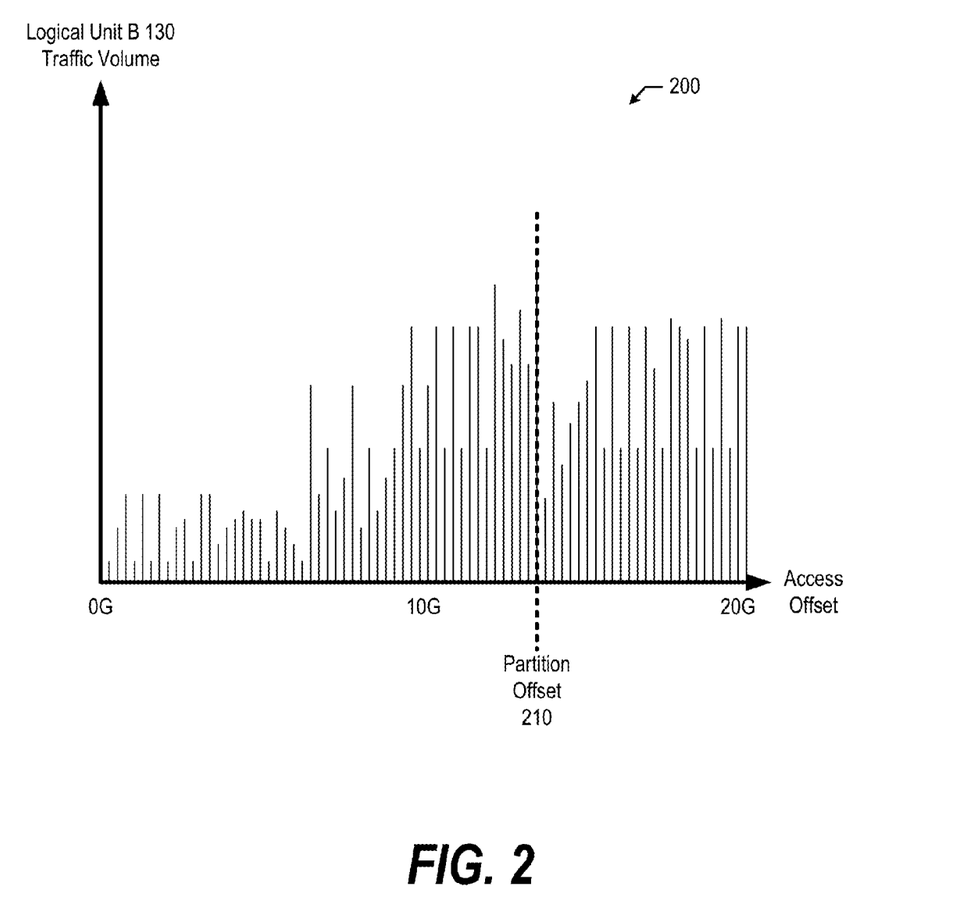
FIG. 2 is a diagram showing a relationship between logical unit traffic volume relative to logical unit access offsets.

FIG. 2 is a diagram showing a relationship between logical unit traffic volume relative to logical unit access offsets. Graph 200 shows traffic volume over logical unit B 130's logical unit offset range. As can be seen, logical unit B 130 has light traffic volume from 0 G-7 G access offsets, and increased traffic volume from 7 G-20 G access offsets. Storage system 100 analyzes the traffic volume and determines to partition logical unit B 130 into two logical unit partitions based upon partition offset 210, which storage system 100 determined to be a point at which the amount of traffic will be balanced between logical unit A 120 and logical unit B 130 after one of the partitions is reassigned to logical unit A 120. In turn, storage system 100 changes the preferred controller ownership of one of the logical unit partitions in order to balance traffic load across storage controller 1 105 and storage controller 2 110 (see FIG. 3 and corresponding text for further details).

Figure 3:
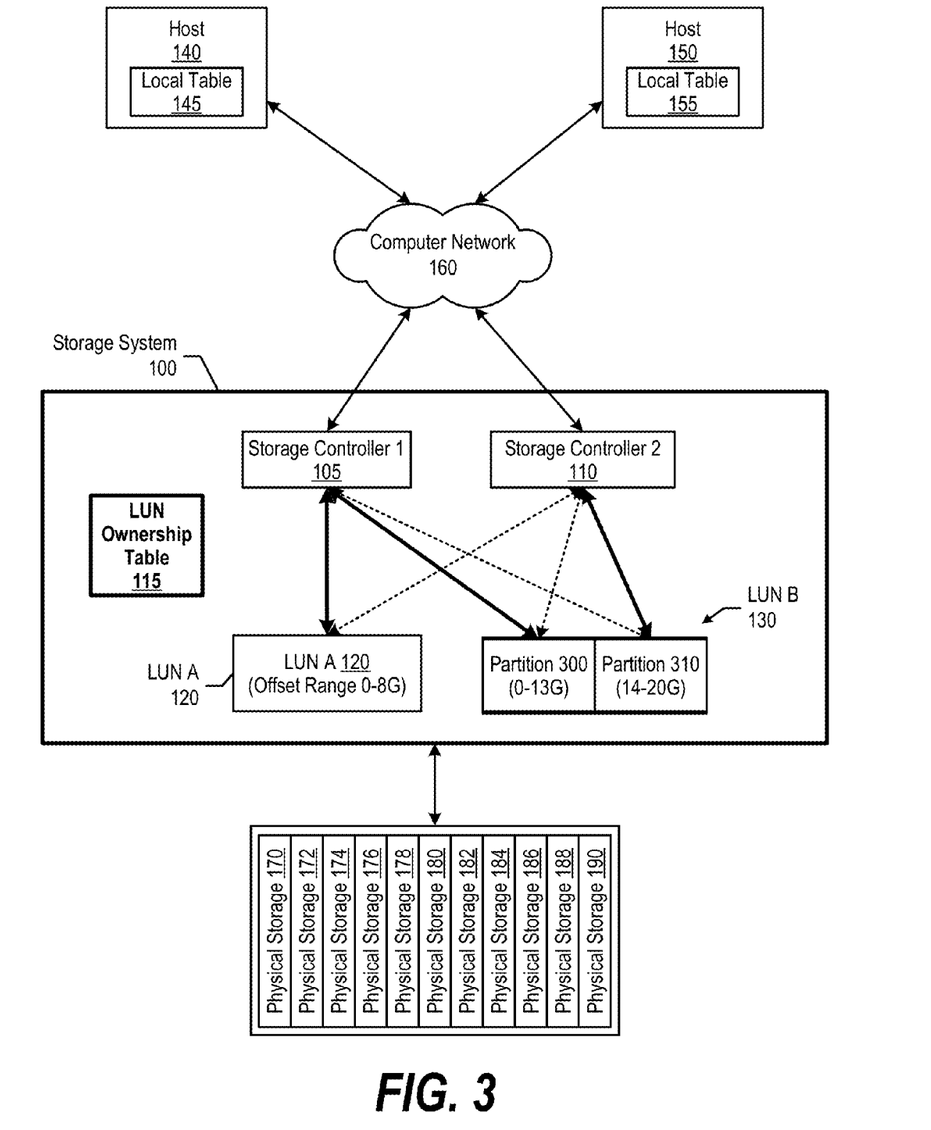
FIG. 3 is an example of a storage system changing preferred controller ownership when a controller traffic load ratio reaches an auto-balance threshold and the storage system splits a logical unit into logical unit partitions.

FIG. 3 is an example of a storage system changing preferred controller ownership when a controller traffic load ratio reaches an auto-balance threshold and the storage system splits a logical unit into logical unit partitions. During operation, storage system 100 monitors the relative amount of data traffic through storage controller 1 105 and storage controller 2 110, which is referred to herein as the controller traffic load ratio. When the amount of data traffic through storage controller 1 105 becomes disproportionate to the amount of data traffic through storage controller 2 110 (e.g., reaches an auto-balance threshold), storage system 100 analyzes the controller traffic load and, if needed, splits one of the logical units into logical unit partitions that, in turn, are assigned to different storage controllers.

Based upon the traffic load shown in FIG. 2, FIG. 3 shows that, compared to FIG. 1, storage system 100 splits logical unit B 125 into two logical unit partitions 300 and 310, which correspond to partition offset ranges 0-13 G and 14-20 G. In turn, storage system 100 assigned storage controller 1 105 to logical unit partition 300 and assigned storage controller 2 110 to logical unit partition 310, thus balancing traffic loads between storage controller 1 105 and storage controller 2 110.

Figure 4:
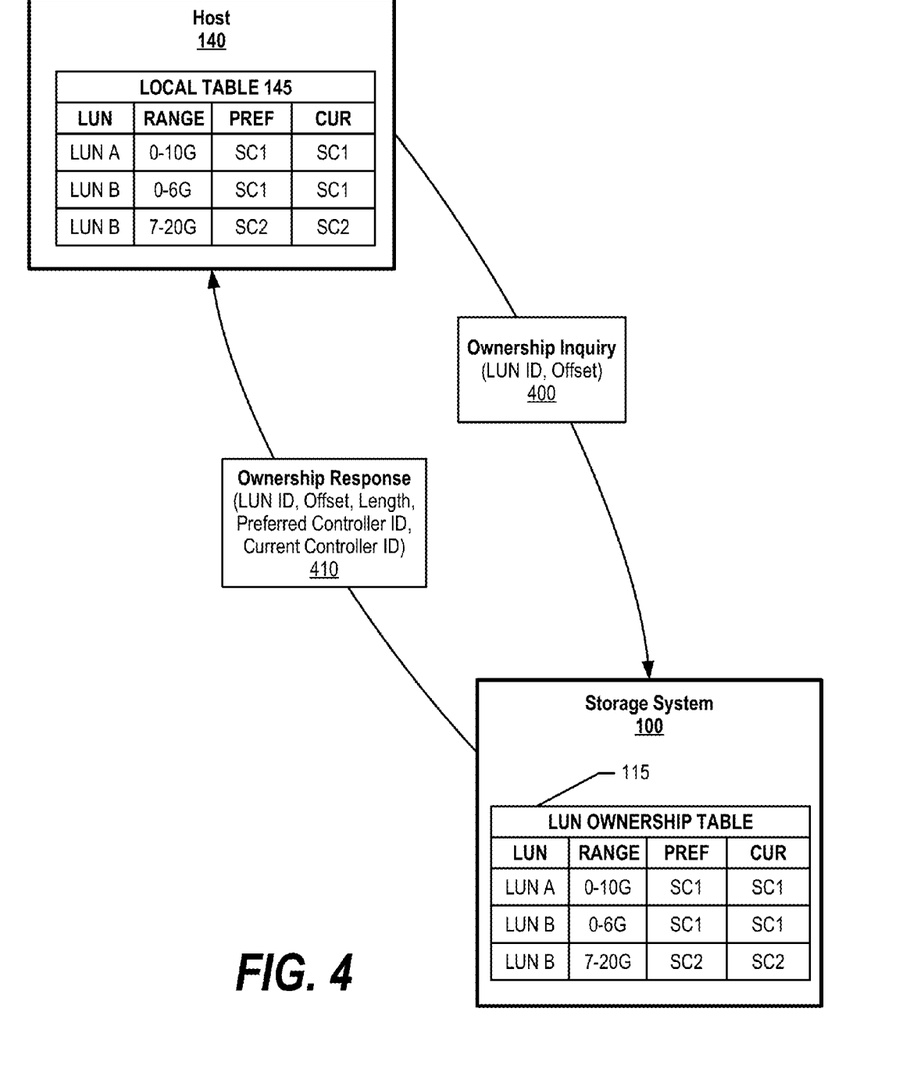
FIG. 4 is a diagram showing one example of a host system sending an inquiry to a storage system prior to accessing a logical unit through a storage controller.

FIG. 4 is a diagram showing one example of a host system sending an inquiry to a storage system prior to accessing a logical unit through a storage controller. Host 140 sends inquiry 400 to storage system 100, which inquires about the ownership of a particular logical unit (identified by logical unit identifier and an access offset in inquiry 400). Storage system 100, in turn, access LUN ownership table 115 and retrieves the preferred controller ID and the current controller ID corresponding to the logical unit and access offset identified in inquiry 400. Storage system 100 sends ownership response 410 back to host 140, which includes the logical unit identifier, partition offset information (partition starting offset value and partition length), the preferred controller ID, and the current controller ID. Host 140, in turn, updates local table 145 with the ownership information, the partition offset information, and proceeds to access the logical unit via the identified preferred storage controller (see FIG. 6 and corresponding text for further details).

Figure 5:
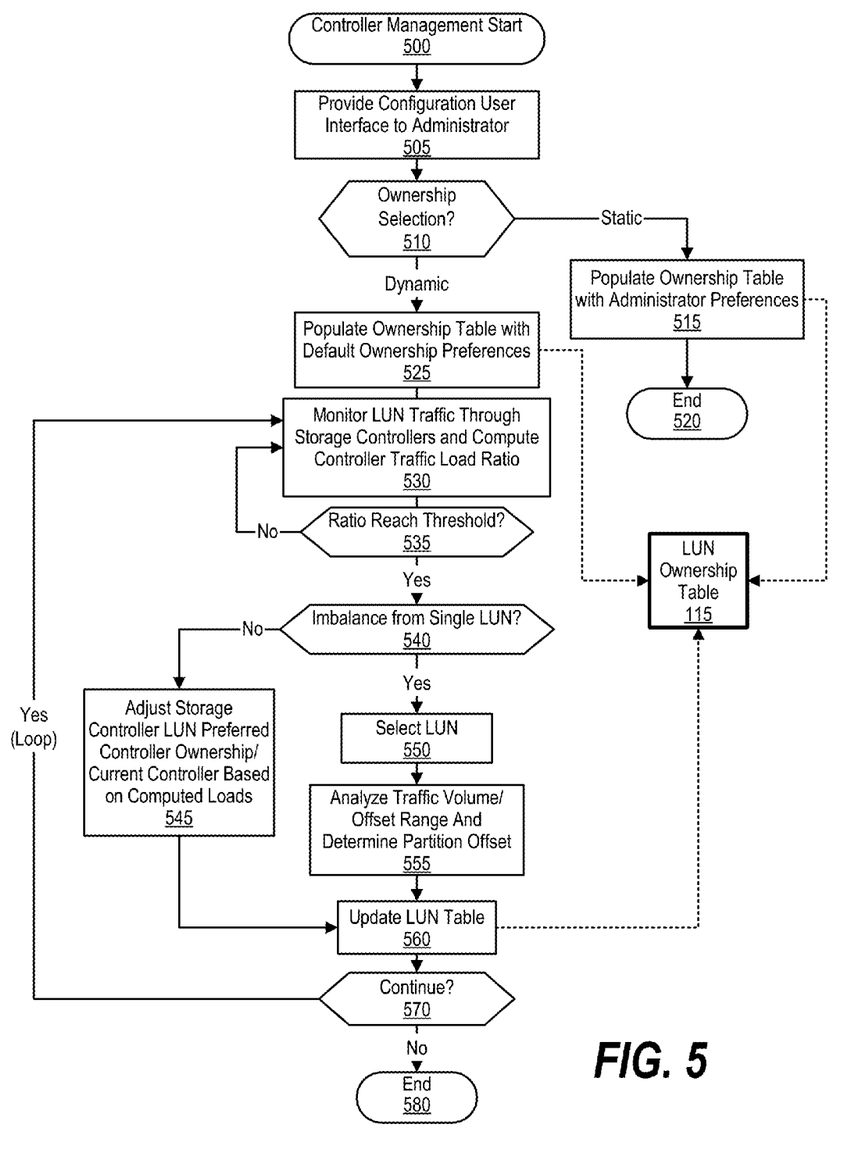
FIG. 5 is a flowchart showing one example of steps taken by a storage system to manage logical unit data traffic load balancing between storage controllers.

FIG. 5 is a flowchart showing one example of steps taken by a storage system to manage logical unit data traffic load balancing between storage controllers. Processing commences at 500, whereupon the storage system provides a configuration user interface to a user and receives an ownership configuration selection from the user (505). A determination is made as to whether the ownership configuration selection is a static configuration selection or a dynamic configuration selection (decision 510). If the user selects a static ownership configuration, decision 510 branches to the "static" branch, whereupon the storage system populates logical unit ownership table 115 with static ownership preferences included in the user's response and preferred controller ownership management ends at 520. As those skilled in the art can appreciate, storage system 100 may update the current controller information in a static ownership configuration, but the preferred controller ownership remains fixed.

On the other hand, if the user selects a dynamic ownership configuration, decision 510 branches to the "dynamic" branch, whereupon the storage system populates logical unit ownership table 115 with default ownership preferences at 525. For example, the storage system may assign the first half of logical units (e.g., 1-3) to the first storage controller and assign the second half of logical units (e.g., 4-6) to the second storage controller.

At 530, the storage system monitors input/output loads of the storage controllers (data traffic load) and computes a controller traffic load ratio. In one embodiment, the storage system may use a total number of bytes transferred within a given time period (e.g., within the last minute). In this embodiment, if controller 1 owns logical unit A and controller 2 owns logical unit B, then the controller traffic load ratio is "traffic on LUN A:traffic on LUN B".

A determination is made as to whether the controller traffic load ratio exceeds an auto-balance threshold (decision 535). In one embodiment, the user provides the auto-balance threshold, such as +/−10. If the controller traffic load ratio does not exceed the auto-balance threshold, decision 535 branches to the "No" branch, which loops back to continue to monitor the data traffic loads on each storage controller.

On the other hand, if the controller traffic load ratio reaches the auto-balance threshold, decision 535 branches to the "Yes" branch, whereupon a determination is made as to whether the traffic load can be balanced by changing the preferred controller ownership of an entire logical unit or whether the storage system needs to partition one of the logical units and re-assign one of the logical unit partitions to a different storage controller (decision 540). If the traffic load can be balanced by changing the preferred controller ownership of an entire logical unit, decision 540 branches to the "No" branch, whereupon the storage system adjusts the preferred controller/current controller ownership of one or more logical units accordingly to balance the traffic load between controllers (545) and updates ownership table 115 at 560.

On the other hand, if the storage system needs to partition one of the logical units, decision 540 branches to the "Yes" branch, whereupon the storage system selects one of the logical units (550), analyzes the traffic volume of the selected logical unit relative to the traffic volume's corresponding access offsets, and determines a partition offset based on the analysis (555) (e.g., identifying an offset that evenly splits the overall traffic volume between the controllers, see FIG. 2 and corresponding text for further details). At 560, the storage system updates ownership table 115 accordingly, which may include adding new table entries to accommodate the logical unit partitions.

A determination is made as to whether to continuing monitoring the data traffic loads on the storage controllers (decision 570). If the storage system should continue to monitor data traffic loads, decision 570 branches to the "Yes" branch, which loops back to dynamically adjust preferred controller ownership based upon load conditions. On the other hand, if the storage controller should stop monitoring load conditions, decision 570 branches to the "No" branch, whereupon processing ends at 580.

Figure 6:
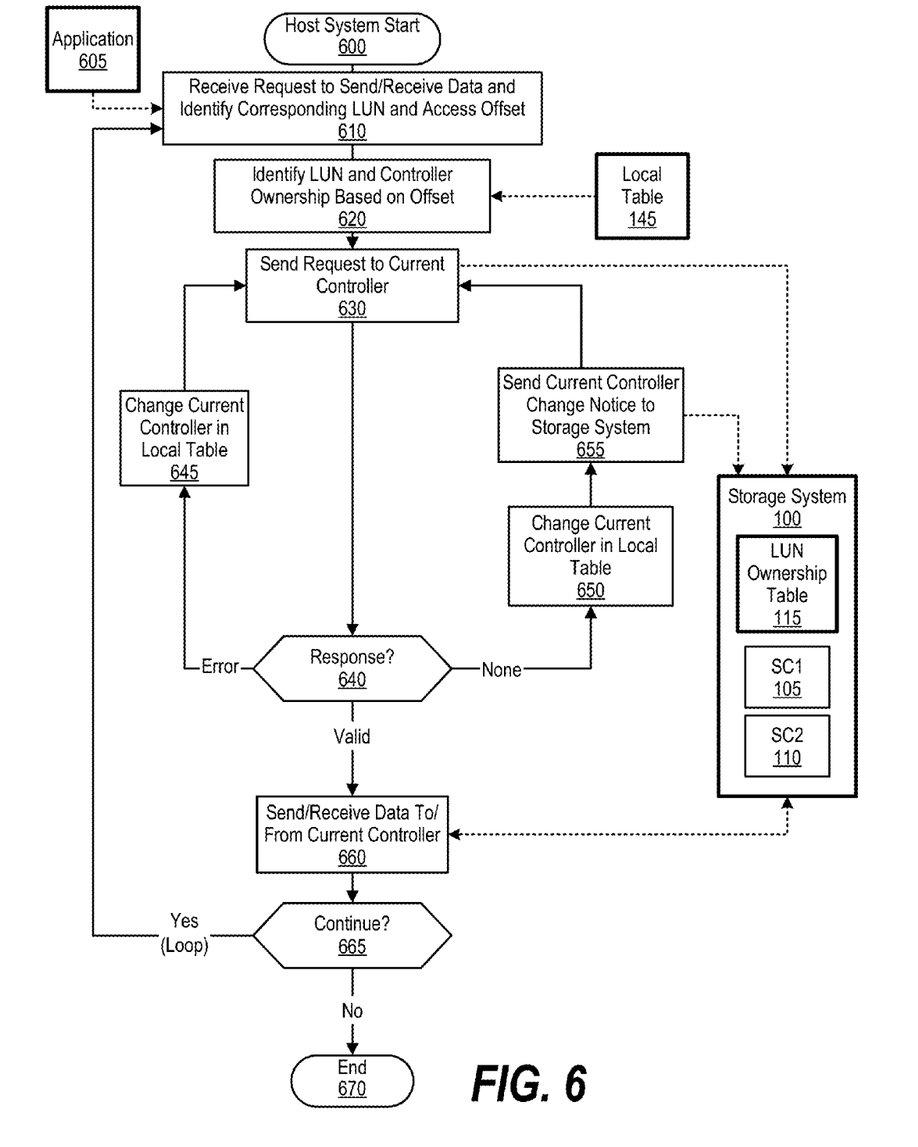
FIG. 6 is a flowchart showing one example of steps taken by a host system to send/receive data to/from logical units through selected storage controllers.

FIG. 6 is a flowchart showing one example of steps taken by a host system to send/receive data to/from logical units through selected storage controllers. Processing commences at 600, whereupon the host system receives a request from application 605 to send/receive data and identifies the logical unit and access offset associated with the request (via from application 605 or a file system) (610).

At 620, the host system accesses local table 145 to identify the current controller based upon the identified logical unit and access offset. Local table 145 includes ownership information based upon the host system's last interaction with storage system 100. The host system sends a request to the identified current controller to send/retrieve data to/from the identified logical unit and access offset (630).

A determination is made as to whether the host system received a response from storage system 100 (decision 640). When a connection between the host system and storage system 100 is functioning correctly, storage system 100 receives the request and provides either a valid response or an error response to the host system that indicates the controller, which the host thought was the current controller, is actually not the current controller of the requested logical unit/access offset combination. However, when the connection is not functioning properly (transmit path down, receive path down, storage controller non-functional, etc.), the host system does not receive a response.

If the host system receives a valid response, decision 640 branches to the "Valid" branch whereupon the host system sends/receives data to/from the LUN through the current controller (660). On the other hand, if the host received an error message, decision 640 branches to the "Error" branch whereupon the host changes the current controller of the LUN in local table 145 (e.g., controller 1 to controller 2) at 645, and resends a request to the new current controller (630).

However, if the host does not receive a response from storage system 100, decision 640 branches to the "None" branch, whereupon the host changes the current controller of the LUN in local table 145 (e.g., controller 1 to controller 2) at 650, sends a notice to storage system 100 of the change in current controller (655), and resends a request to the new current controller at 630. In one embodiment, storage system 100 updates the current controller of the LUN in LUN ownership table 115 when it receives the notice from the host system. The host then sends/receives data to/from the LUN through the new current controller (660).

A determination is made on whether to continue processing requests from applications such as application 605 (decision 665). If host processing should continue, decision 665 branches to the "Yes" branch, whereupon the host system receives and processes application requests. This looping continues until host processing should terminate, at which point decision 665 branches to the "No" branch, whereupon processing ends at 670. The discussion above focuses on interactions between a host and a storage system relative to this disclosure and, as those skilled in the art can appreciate, other types of interactions may be sent between a host and storage system.

Figure 7:
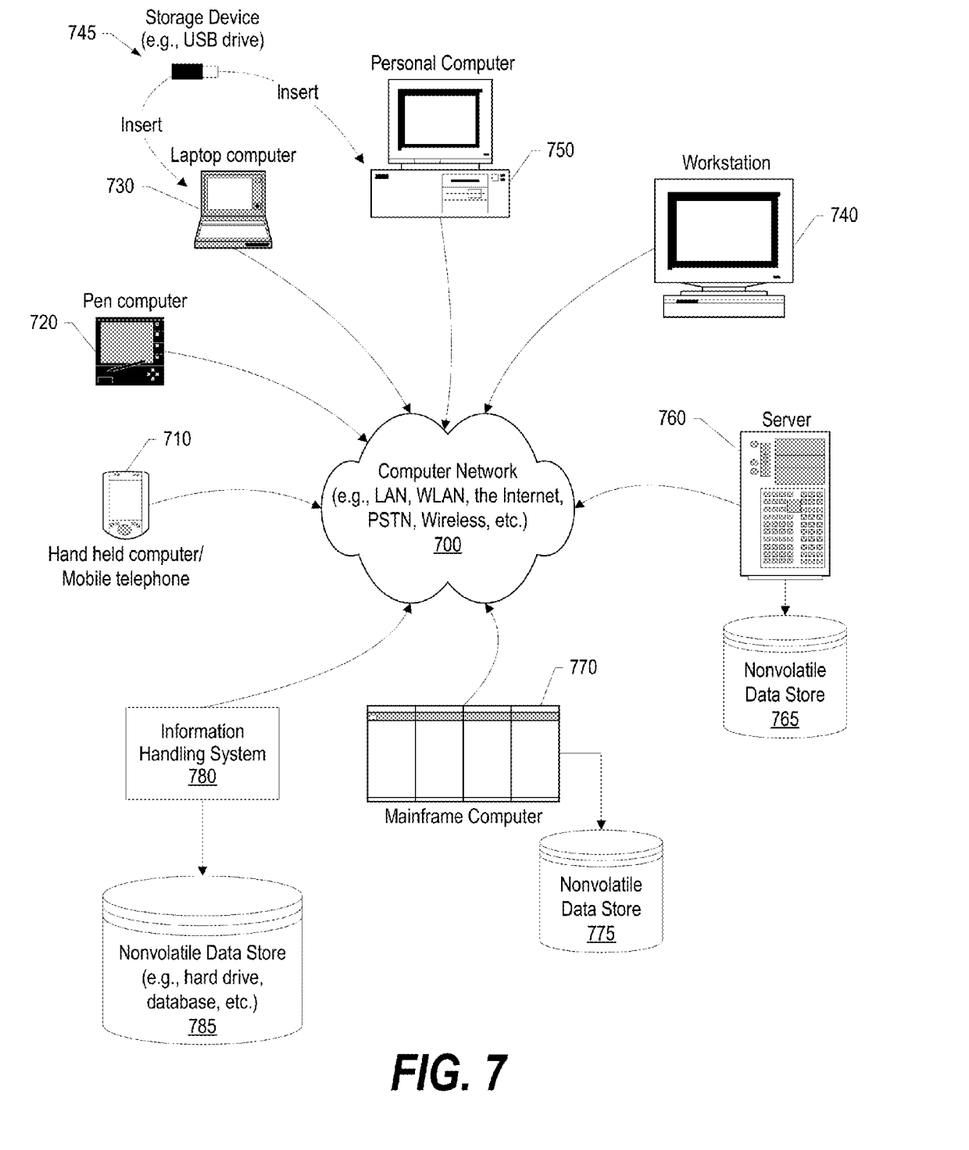
FIG. 7 is a block diagram of a data processing system in which the methods described herein can be implemented.

FIG. 7 illustrates information handling system 700, which is a simplified example of a computer system capable of performing the computing operations described herein. Information handling system 700 includes one or more processors 710 coupled to processor interface bus 712. Processor interface bus 712 connects processors 710 to Northbridge 715, which is also known as the Memory Controller Hub (MCH). Northbridge 715 connects to system memory 720 and provides a means for processor(s) 710 to access the system memory. Graphics controller 725 also connects to Northbridge 715. In one embodiment, PCI Express bus 718 connects Northbridge 715 to graphics controller 725. Graphics controller 725 connects to display device 730, such as a computer monitor.

Northbridge 715 and Southbridge 735 connect to each other using bus 719. In one embodiment, the bus is a Direct Media Interface (DMI) bus that transfers data at high speeds in each direction between Northbridge 715 and Southbridge 735. In another embodiment, a Peripheral Component Interconnect (PCI) bus connects the Northbridge and the Southbridge. Southbridge 735, also known as the I/O Controller Hub (ICH) is a chip that generally implements capabilities that operate at slower speeds than the capabilities provided by the Northbridge. Southbridge 735 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 796 and "legacy" I/O devices (using a "super I/O" chip). The "legacy" I/O devices (798) can include, for example, serial and parallel ports, keyboard, mouse, and/or a floppy disk controller. The LPC bus also connects Southbridge 735 to Trusted Platform Module (TPM) 795. Other components often included in Southbridge 735 include a Direct Memory Access (DMA) controller, a Programmable Interrupt Controller (PIC), and a storage device controller, which connects Southbridge 735 to nonvolatile storage device 785, such as a hard disk drive, using bus 784.

ExpressCard 755 is a slot that connects hot-pluggable devices to the information handling system. ExpressCard 755 supports both PCI Express and USB connectivity as it connects to Southbridge 735 using both the Universal Serial Bus (USB) the PCI Express bus. Southbridge 735 includes USB Controller 740 that provides USB connectivity to devices that connect to the USB. These devices include webcam (camera) 750, infrared (IR) receiver 748, keyboard and trackpad 744, and Bluetooth device 746, which provides for wireless personal area networks (PANs). USB Controller 740 also provides USB connectivity to other miscellaneous USB connected devices 742, such as a mouse, removable nonvolatile storage device 745, modems, network cards, ISDN connectors, fax, printers, USB hubs, and many other types of USB connected devices. While removable nonvolatile storage device 745 is shown as a USB-connected device, removable nonvolatile storage device 745 could be connected using a different interface, such as a Firewire interface, etcetera.

Wireless Local Area Network (LAN) device 775 connects to Southbridge 735 via the PCI or PCI Express bus 772. LAN device 775 typically implements one of the IEEE 802.11 standards of over-the-air modulation techniques that all use the same protocol to wireless communicate between information handling system 700 and another computer system or device. Optical storage device 790 connects to Southbridge 735 using Serial ATA (SATA) bus 788. Serial ATA adapters and devices communicate over a high-speed serial link. The Serial ATA bus also connects Southbridge 735 to other forms of storage devices, such as hard disk drives. Audio circuitry 760, such as a sound card, connects to Southbridge 735 via bus 758. Audio circuitry 760 also provides functionality such as audio line-in and optical digital audio in port 762, optical digital output and headphone jack 764, internal speakers 766, and internal microphone 768. Ethernet controller 770 connects to Southbridge 735 using a bus, such as the PCI or PCI Express bus. Ethernet controller 770 connects information handling system 700 to a computer network, such as a Local Area Network (LAN), the Internet, and other public and private computer networks.

While FIG. 7 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 795) shown in FIG. 7 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 8.

Figure 8:
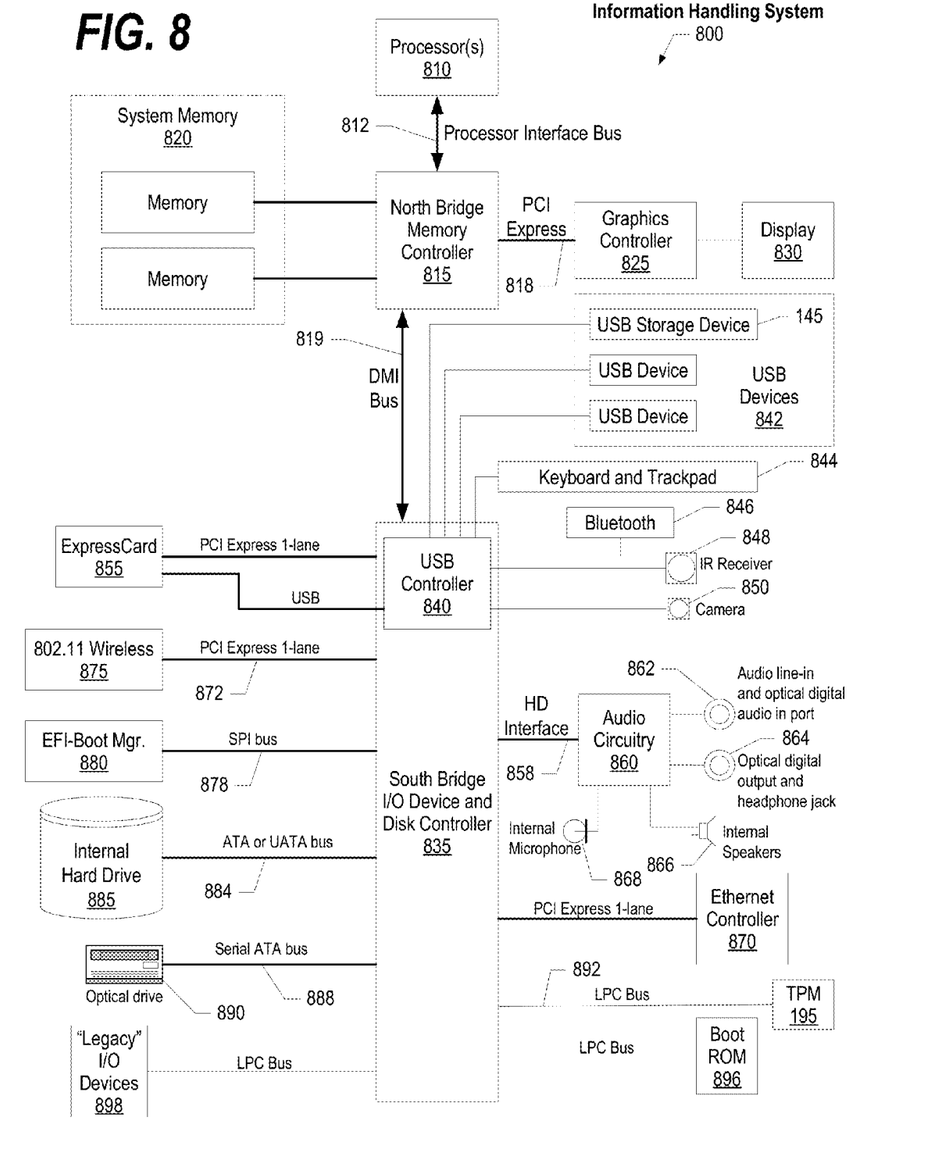
FIG. 8 provides an extension of the information handling system environment shown in FIG. 7 to illustrate that the methods described herein can be performed on a wide variety of information handling systems which operate in a networked environment.

FIG. 8 provides an extension of the information handling system environment shown in FIG. 7 to illustrate that the methods described herein can be performed on a wide variety of information handling systems that operate in a networked environment. Types of information handling systems range from small handheld devices, such as handheld computer/mobile telephone 810 to large mainframe systems, such as mainframe computer 870. Examples of handheld computer 810 include personal digital assistants (PDAs), personal entertainment devices, such as MP3 players, portable televisions, and compact disc players. Other examples of information handling systems include pen, or tablet, computer 820, laptop, or notebook, computer 830, workstation 840, personal computer system 850, and server 860. Other types of information handling systems that are not individually shown in FIG. 8 are represented by information handling system 880. As shown, the various information handling systems can be networked together using computer network 800. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 8 depicts separate nonvolatile data stores (server 860 utilizes nonvolatile data store 865, mainframe computer 870 utilizes nonvolatile data store 875, and information handling system 880 utilizes nonvolatile data store 885). The nonvolatile data store can be a component that is external to the various information handling systems or can be internal to one of the information handling systems. In addition, removable nonvolatile storage device 745 can be shared among two or more information handling systems using various techniques, such as connecting the removable nonvolatile storage device 745 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
 detecting, by a storage system, that a controller traffic load ratio between a first storage controller and a second storage controller has reached a threshold, wherein the first storage controller and the second storage controller correspond to at least one of a plurality of logical units included in the storage system;

partitioning a selected one of the plurality of logical units into a plurality of logical unit partitions in response to the controller traffic load ratio reaching the threshold; and changing a preferred controller ownership of a selected one of the plurality of logical unit partitions from the first storage controller to the second storage controller.

2. The method of claim 1 further comprising:

analyzing traffic volume of the selected logical unit relative to a plurality of corresponding access offsets; and determining a partition offset based upon the analysis, wherein the selected logical unit is partitioned based upon the partition offset.

3. The method of claim 1 further comprising:

subsequent to changing the preferred controller ownership, receiving an ownership inquiry from a host system, the ownership inquiry including a logical unit identifier and an access offset;

locating an ownership table entry based upon both the logical unit identifier and the access offset;

retrieving, from the ownership table entry, a logical unit identifier, a partition starting offset value, a partition length, and a preferred controller ownership identifier;

including, in an ownership response, the ownership table entry, the logical unit identifier, the partition starting offset value, the partition length, and the preferred controller ownership identifier; and sending the ownership response to the host system.

4. The method of claim 3 further comprising:

receiving the ownership response at the host system;

computing a partition offset range based upon the partition starting offset value and the partition length; and storing, in a table entry at the host system, the preferred controller identifier and the partition offset range.

5. The method of claim 1 wherein the storage system configures the first storage controller and the second storage controller in an active/passive controller configuration.

6. The method of claim 1 wherein, prior to the determination that the controller traffic load ratio has reached the threshold, the method further comprises:

identifying a first data traffic amount passing through the first storage controller corresponding to one or more first logical units included in the plurality of logical units;

identifying a second data traffic amount passing through the second storage controller corresponding to one or more second logical units included in the plurality of logical units; and computing the controller traffic load ratio based upon the first data traffic amount and the second data traffic amount.

7. The method of claim 1 wherein the threshold is an auto-balance threshold, the method further comprising:

displaying, by the storage system, an ownership configuration window to a user;

receiving an ownership configuration selection from the user;

determining that the ownership configuration selection is a dynamic ownership selection; and configuring the storage system to balance the controller traffic load ratio, wherein the balancing includes changing one or more preferred controller ownerships of one or more of the plurality of logical units when the controller traffic load ratio reaches the auto-balance threshold.

8. An information handling system comprising:

one or more processors;

a memory coupled to at least one of the processors;

a set of computer program instructions stored in the memory and executed by at least one of the processors in order to perform actions of:

detecting, by a storage system, that a controller traffic load ratio between a first storage controller and a second storage controller has reached a threshold, wherein the first storage controller and the second storage controller correspond to at least one of a plurality of logical units included in the storage system;

partitioning a selected one of the plurality of logical units into a plurality of logical unit partitions in response to the controller traffic load ratio reaching the threshold; and changing a preferred controller ownership of a selected one of the plurality of logical unit partitions from the first storage controller to the second storage controller.

9. The information handling system of claim 8 wherein the processors perform additional actions comprising:

analyzing traffic volume of the selected logical unit relative to a plurality of corresponding access offsets; and determining a partition offset based upon the analysis, wherein the selected logical unit is partitioned based upon the partition offset.

10. The information handling system of claim 8 wherein the processors perform additional actions comprising:

subsequent to changing the preferred controller ownership, receiving an ownership inquiry from a host system, the ownership inquiry including a logical unit identifier and an access offset;

locating an ownership table entry based upon both the logical unit identifier and the access offset;

retrieving, from the ownership table entry, a logical unit identifier, a partition starting offset value, a partition length, and a preferred controller ownership identifier;

including, in an ownership response, the ownership table entry, the logical unit identifier, the partition starting offset value, the partition length, and the preferred controller ownership identifier; and sending the ownership response to the host system.

11. The information handling system of claim 10 wherein the processors perform additional actions comprising:

receiving the ownership response at the host system;

computing a partition offset range based upon the partition starting offset value and the partition length; and storing, in a table entry at the host system, the preferred controller identifier and the partition offset range.

12. The information handling system of claim 8 wherein the storage system configures the first storage controller and the second storage controller in an active/passive controller configuration.

13. The information handling system of claim 8 wherein, prior to the determination that the controller traffic load ratio has reached the threshold, the processors perform additional actions comprising:

identifying a first data traffic amount passing through the first storage controller corresponding to one or more first logical units included in the plurality of logical units;

identifying a second data traffic amount passing through the second storage controller corresponding to one or more second logical units included in the plurality of logical units; and computing the controller traffic load ratio based upon the first data traffic amount and the second data traffic amount.

14. The information handling system of claim 8 wherein the threshold is an auto-balance threshold, and wherein the processors perform additional actions comprising:
displaying, by the storage system, an ownership configuration window to a user;
receiving an ownership configuration selection from the user;
determining that the ownership configuration selection is a dynamic ownership selection; and
configuring the storage system to balance the controller traffic load ratio, wherein the balancing includes changing one or more preferred controller ownerships of one or more of the plurality of logical units when the controller traffic load ratio reaches the auto-balance threshold.

15. A non-transitory computer readable medium storing a computer program product comprising computer program code that, when executed by an information handling system, causes the information handling system to perform actions comprising:
detecting, by a storage system, that a controller traffic load ratio between a first storage controller and a second storage controller has reached a threshold, wherein the first storage controller and the second storage controller correspond to at least one of a plurality of logical units included in the storage system;
partitioning a selected one of the plurality of logical units into a plurality of logical unit partitions in response to the controller traffic load ratio reaching the threshold; and
changing a preferred controller ownership of a selected one of the plurality of logical unit partitions from the first storage controller to the second storage controller.

16. The non-transitory computer readable medium of claim 15 wherein the information handling system performs additional actions comprising:
analyzing traffic volume of the selected logical unit relative to a plurality of corresponding access offsets; and
determining a partition offset based upon the analysis, wherein the selected logical unit is partitioned based upon the partition offset.

17. The non-transitory computer readable medium of claim 15 wherein the information handling system performs additional actions comprising:
subsequent to changing the preferred controller ownership, receiving an ownership inquiry from a host system, the ownership inquiry including a logical unit identifier and an access offset;
locating an ownership table entry based upon both the logical unit identifier and the access offset;
retrieving, from the ownership table entry, a logical unit identifier, a partition starting offset value, a partition length, and a preferred controller ownership identifier;
including, in an ownership response, the ownership table entry, the logical unit identifier, the partition starting offset value, the partition length, and the preferred controller ownership identifier; and
sending the ownership response to the host system.

18. The non-transitory computer readable medium of claim 17 wherein the information handling system performs additional actions comprising:
receiving the ownership response at the host system;
computing a partition offset range based upon the partition starting offset value and the partition length; and
storing, in a table entry at the host system, the preferred controller identifier and the partition offset range.

19. The non-transitory computer readable medium of claim 15 wherein the storage system configures the first storage controller and the second storage controller in an active/passive controller configuration.

20. The non-transitory computer readable medium of claim 15 wherein, prior to the determination that the controller traffic load ratio has reached the threshold, the information handling system performs additional actions comprising:
identifying a first data traffic amount passing through the first storage controller corresponding to one or more first logical units included in the plurality of logical units;
identifying a second data traffic amount passing through the second storage controller corresponding to one or more second logical units included in the plurality of logical units; and
computing the controller traffic load ratio based upon the first data traffic amount and the second data traffic amount.

* * * * *